(12) United States Patent
Burnett et al.

(10) Patent No.: US 8,147,162 B1
(45) Date of Patent: Apr. 3, 2012

(54) COUPLING

(75) Inventors: Marvin K. Burnett, Archbold, OH (US); Terry W. Armey, Napoleon, OH (US); Brian D. Fritch, Stryker, OH (US)

(73) Assignee: Sauder Woodworking Co., Archbold, OH (US)

( * ) Notice: Subject to any disclaimer, the term of this patent is extended or adjusted under 35 U.S.C. 154(b) by 0 days.

(21) Appl. No.: 12/833,056

(22) Filed: Jul. 9, 2010

Related U.S. Application Data

(62) Division of application No. 11/903,232, filed on Sep. 21, 2007, now abandoned.

(51) Int. Cl.
   F16B 7/00 (2006.01)
   F16B 12/36 (2006.01)
   F16B 13/00 (2006.01)
   B25G 3/00 (2006.01)

(52) U.S. Cl. ............... 403/292; 403/293; 403/DIG. 13; 52/837; 312/263

(58) Field of Classification Search .................. 403/286, 403/292, 396, 410, 293, 298, 381, DIG. 11, 403/DIG. 12, DIG. 13; 52/105, 583.1, 586.2, 52/837; 312/111, 140, 257.1, 263
See application file for complete search history.

(56) References Cited

U.S. PATENT DOCUMENTS

| | | | |
|---|---|---|---|
| 1,537,678 A | | 5/1925 | Jensen |
| 2,028,229 A | * | 1/1936 | Luhn ............................. 446/122 |
| 2,116,584 A | | 5/1938 | Shelby |
| 2,735,146 A | * | 2/1956 | Purviance ...................... 403/294 |
| 2,863,185 A | * | 12/1958 | Riedi ............................. 403/297 |
| 3,336,689 A | | 8/1967 | Miller |
| 3,552,056 A | * | 1/1971 | Meates .......................... 446/126 |
| 3,798,867 A | | 3/1974 | Starling |
| 4,275,972 A | * | 6/1981 | Bowen et al. .................. 403/401 |
| 4,407,106 A | * | 10/1983 | Beck ................................. 52/841 |
| 4,570,408 A | * | 2/1986 | Frascaroli et al. ............... 52/843 |
| 5,090,835 A | * | 2/1992 | Cox ................................ 403/294 |
| 5,433,416 A | | 7/1995 | Johnson |
| D384,271 S | | 9/1997 | Kozyrski |
| 5,704,183 A | * | 1/1998 | Woolford ........................ 52/604 |
| 6,017,093 A | * | 1/2000 | Moser ........................ 297/452.18 |
| 6,036,398 A | * | 3/2000 | Theodorou .................... 403/292 |
| 6,186,691 B1 | * | 2/2001 | Rudolf-Bauer ................. 403/31 |
| 6,227,754 B1 | | 5/2001 | von Nessen-Lapp et al. |
| 6,341,467 B1 | | 1/2002 | Wycech |
| 6,357,960 B1 | * | 3/2002 | Cornelius et al. ............. 403/381 |

(Continued)

FOREIGN PATENT DOCUMENTS

JP      11140994      5/1999

OTHER PUBLICATIONS

Office Action issued in U.S. Appl. No. 11/903,232, mailed Apr. 7, 2009.

(Continued)

Primary Examiner — Michael P Ferguson
Assistant Examiner — Nahid Amiri
(74) Attorney, Agent, or Firm — MacMillan, Sobanski & Todd, LLC

(57) ABSTRACT

A coupling for joining together furniture members that has a center portion including a center portion geometric configuration, a first portion including a first portion geometric configuration, a second portion including a second portion geometric configuration, a first end and a second end.

8 Claims, 9 Drawing Sheets

U.S. PATENT DOCUMENTS

| | | |
|---|---|---|
| 6,578,341 B2 | 6/2003 | Hoffmann et al. |
| 6,874,291 B1 | 4/2005 | Weber |
| 6,991,397 B2 * | 1/2006 | Welch .......................... 403/297 |
| 7,331,781 B1 * | 2/2008 | Bandeen ........................... 433/7 |
| 7,398,622 B2 * | 7/2008 | Walker ....................... 52/204.69 |
| 2006/0165484 A1 * | 7/2006 | Walker .......................... 403/403 |

OTHER PUBLICATIONS

Office Action issued in U.S. Appl. No. 11/903,232, mailed Apr. 15, 2010.

* cited by examiner

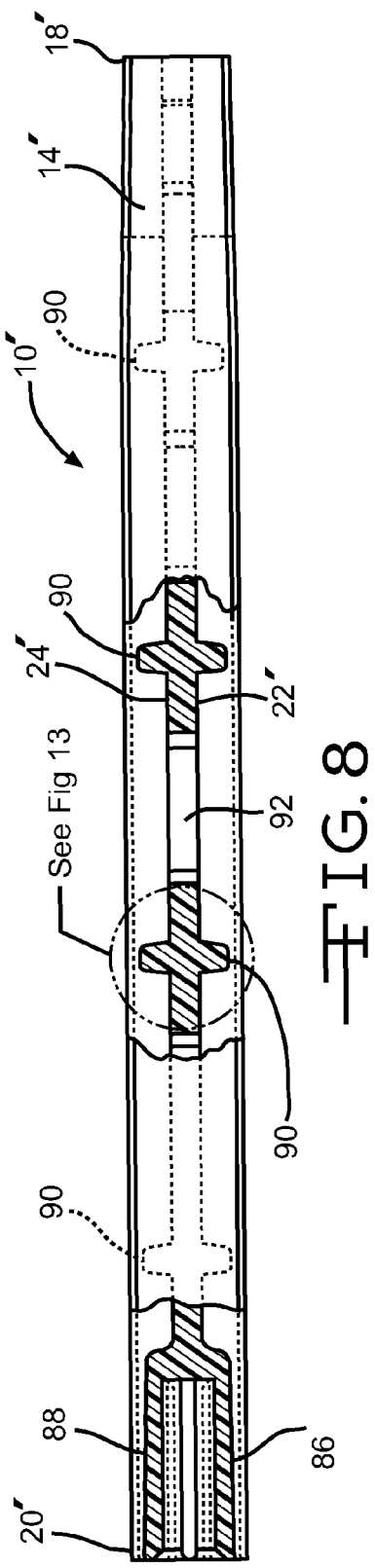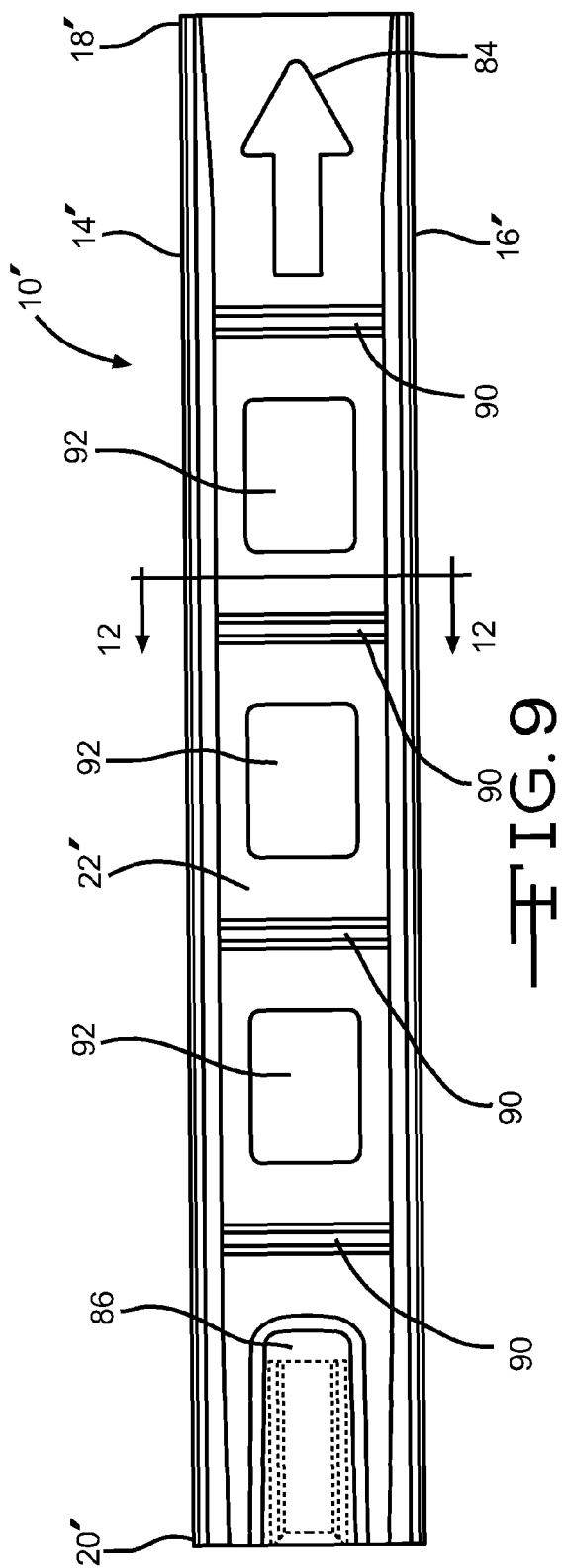

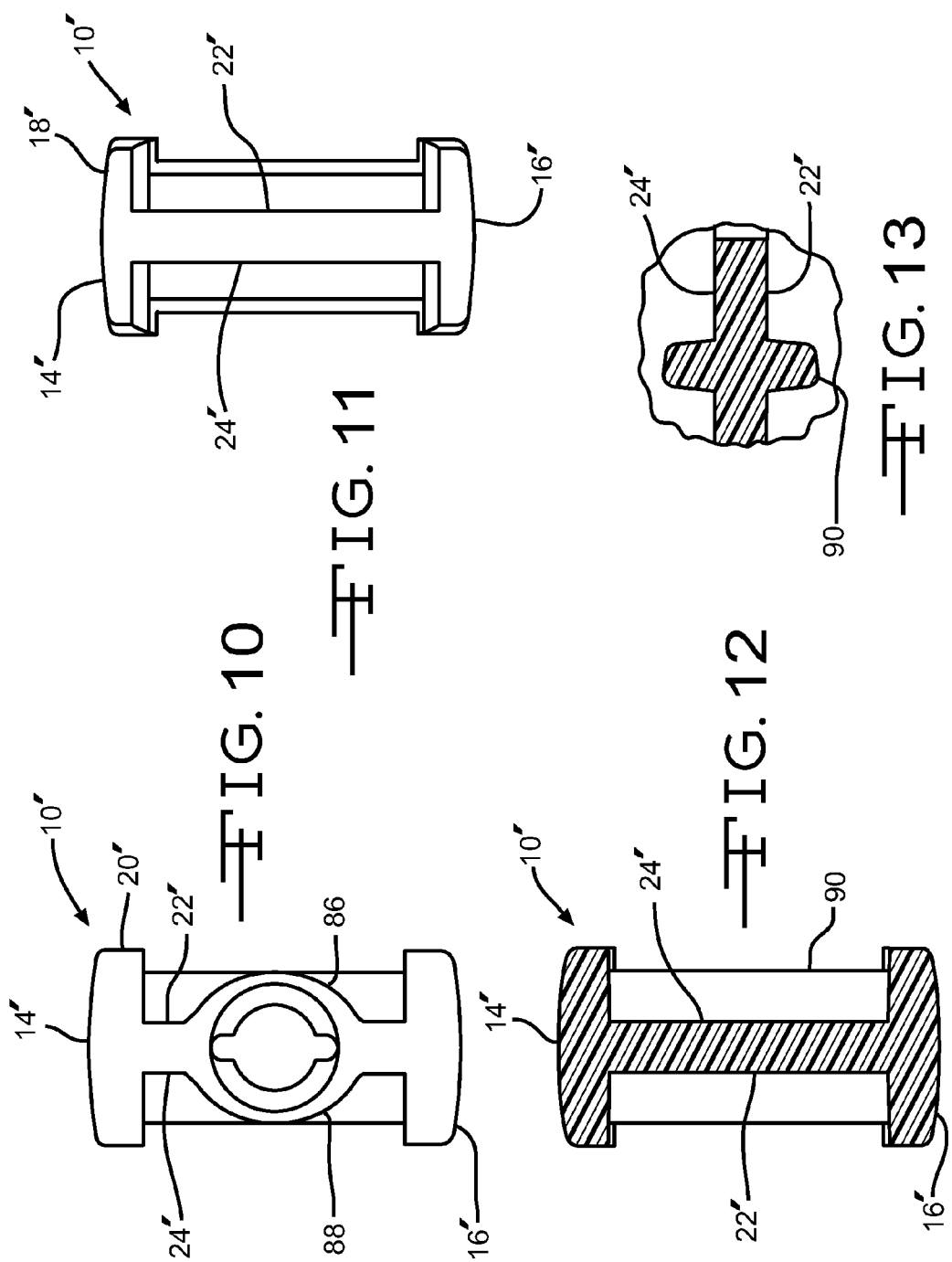

COUPLING

CROSS-REFERENCE TO RELATED APPLICATIONS

This is a division of U.S. patent application Ser. No. 11/903,232, which was filed on Sep. 21, 2007.

TECHNICAL FIELD

The invention is generally related to a coupling. More specifically, the invention is directed to a coupling for joining together furniture members.

BACKGROUND OF THE INVENTION

Ready-to-assemble (RTA) furniture consists of manufactured furniture members that are sold to consumers in an unassembled condition. The consumer assembles the members to construct furniture items such as bookcases, storage cubes, desks, tables and stands.

RTA furniture has been assembled using common fasteners such as screws, bolts, dowel pins and cam and dowel assemblies. The assembly of the furniture members is often complicated and requires the use of tools. The invention provides a coupling that can quickly and easily join together furniture members without the use of tools.

The shapes of RTA furniture components, such as table legs, have been limited due to manufacturing processes. For example, square components are difficult to manufacture because of the limits in wrapping laminate on all four sides of the component. Further, it is difficult to manufacture components that are round because there is no flat surface to reference for lamination. By producing two members wrapped on only three sides with a slight return wrap, the two members can be brought together to form square or round components. The invention provides a coupling that can quickly and easily join together furniture members to form square and round furniture components.

BRIEF SUMMARY OF THE INVENTION

A coupling for joining together furniture members that has a center portion including a center portion geometric configuration, a first portion including a first portion geometric configuration, a second portion including a second portion geometric configuration, a first end and a second end.

BRIEF DESCRIPTION OF THE DRAWINGS

FIG. 8 is a side elevational view of an alternative embodiment coupling according to the invention;

FIG. 9 is a top plan view of the coupling shown in FIG. 8 with portions broken away to show the ribs;

FIG. 10 is a back elevational view of the coupling shown in FIG. 8;

FIG. 11 is a front elevational view of the coupling shown in FIG. 8;

FIG. 12 is a cross-sectional view taken along line 12-12 of FIG. 8; and

FIG. 13 is an enlarged view as shown in FIG. 9.

DETAILED DESCRIPTION OF THE INVENTION

Figure 1:
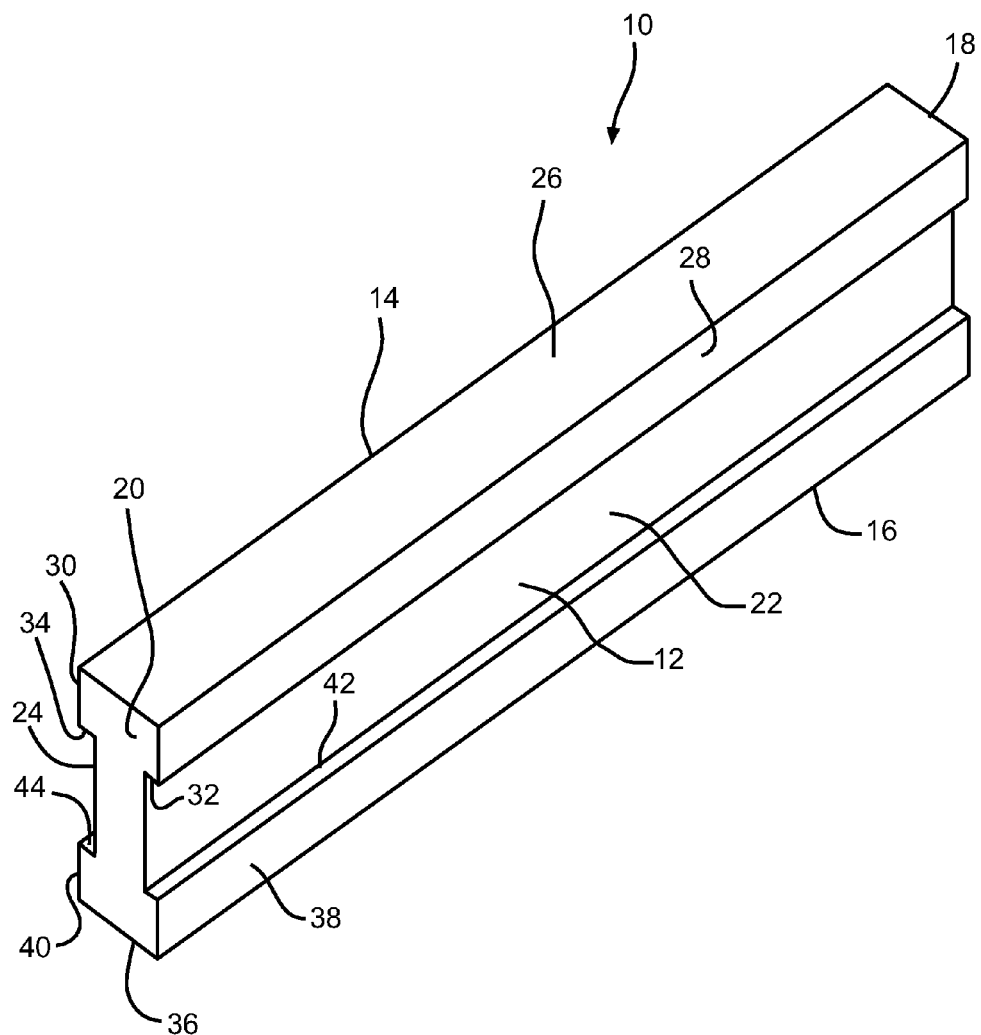
FIG. 1 is a perspective view of a coupling according to the invention.

Referring to FIG. 1, the coupling 10 has a center portion or center plate 12, a first portion or first plate 14, a second portion or second plate 16, a first end 18 and a second end 20. The center portion 12 has a first wall 22 and a second wall 24. In an embodiment, the first and second walls 22 and 24 are substantially parallel.

Still referring to FIG. 1, the first portion 14 has a first portion outside surface 26, a first portion first side surface 28, a first portion second side surface 30, a first portion first inside surface 32 and a first portion second inside surface 34. The second portion 16 has a second portion outside surface 36, a second portion first side surface 38, a second portion second side surface 40, a second portion first inside surface 42 and a second portion second inside surface 44.

The center portion 12, the first portion 14, the second portion 16, the first end 18 and the second end 20 of the coupling 10 can have various configurations, shapes and sizes. In an embodiment, as shown in FIG. 1, the first portion outside surface 26 is substantially perpendicular to the first portion first and second side surfaces 28 and 30 and the first portion outside surface 26 is substantially parallel to the first portion first and second inside surfaces 32 and 34. The second portion outside surface 36 is substantially perpendicular to the second portion first and second side surfaces 38 and 40 and the second portion outside surface 36 is substantially parallel to the second portion first and second inside surfaces 42 and 44. The first wall 22 of the center portion 12 is substantially perpendicular to the first portion outside surface 26, the first portion first inside surface 32, the second portion first inside surface 42 and the second portion outside surface 36. The first wall 22 is substantially parallel to the first portion first side surface 28 and the second portion first side surface 38. The first wall 22 is spaced inwardly from the first portion first side surface 28 and the second portion first side surface 38. The second wall 24 of the center portion 12 is substantially perpendicular to the first portion outside surface 26, the first portion second inside surface 34, the second portion second inside surface 44 and the second portion outside surface 36. The second wall 24 is substantially parallel to the first portion second side surface 30 and the second portion second side surface 40. The second wall 24 is spaced inwardly from the first portion second side surface 30 and the second portion second side surface 40.

In the embodiment shown in FIG. 1, the coupling 10 has an I-shape. The center portion 12, the first portion 14 and the second portion 16 have substantially rectangular shapes. The coupling 10 is elongated between the first and second ends 18 and 20.

The coupling 10 can be made of various natural and synthetic materials such as wood, plastic, metal and fiberglass. An example of a plastic material is polyethylene.

Figure 2:
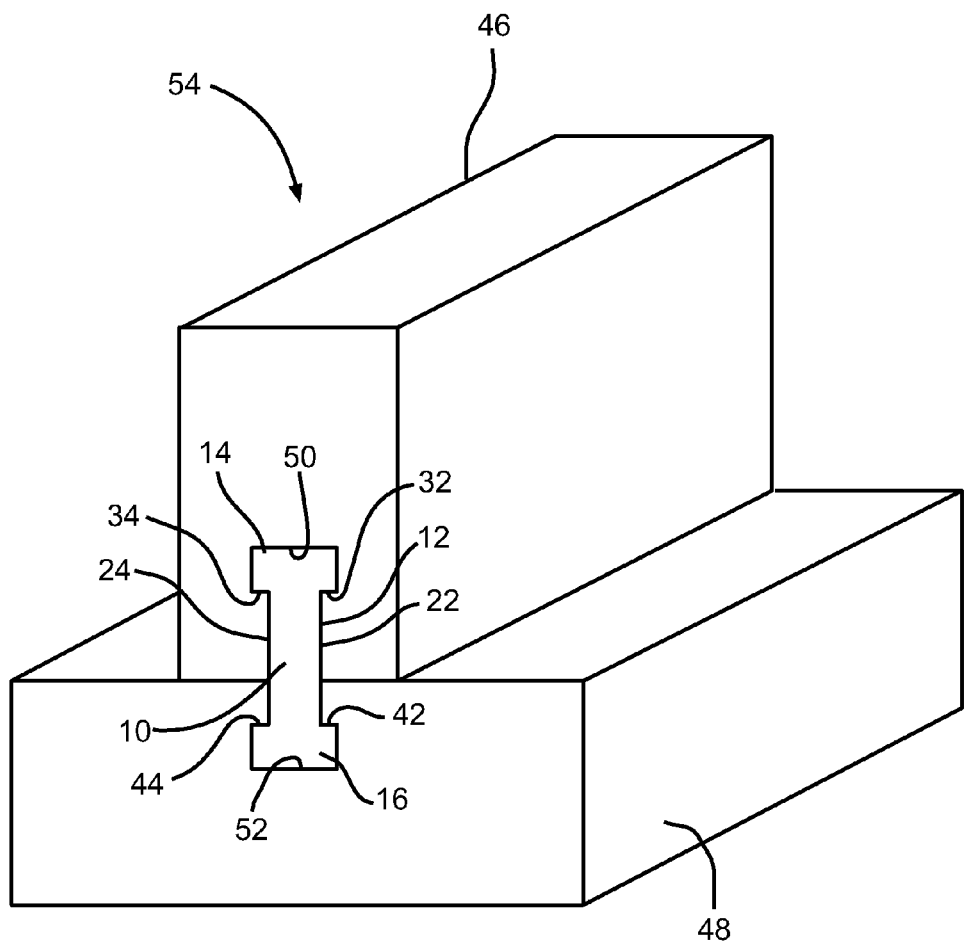
FIG. 2 is a perspective view of two furniture members joined together by a coupling according to the invention.

Referring to FIGS. 2-7, various furniture assemblies that use the coupling 10 are shown. In FIG. 2, a first furniture member 46 and a second furniture member 48 are joined together by the coupling 10. The first furniture member 46 includes a first member groove 50 that has a shape corresponding to the shapes of the center portion 12 and the first portion 14 of the coupling 10. The second furniture member 48 includes a second member groove 52 that has a shape corresponding to the shapes of the center portion 12 and the second portion 16 of the coupling 10. The coupling 10 is inserted in the first and second member grooves 50 and 52. The first and second walls 22 and 24 of the coupling 10 prevent horizontal movement of the first and second furniture members 46 and 48. The inside surfaces 32, 34, 42 and 44 of the coupling 10 prevent vertical movement of the first and second furniture members 46 and 48. The embodiment shown in FIG. 2 is directed to a furniture assembly 54, such as an RTA furniture assembly, having two members. It should be understood that two or more furniture members can be joined by one or more couplings to form a furniture assembly without tools.

The first and second furniture members 46 and 48 can be made of natural or synthetic materials. Examples of natural materials include solid wood, wood particles and various grasses such as straw. Examples of synthetic materials include plastic such as fiberglass reinforced plastic. The natural or synthetic materials can be covered with laminate, paint, stain, varnish or other surface coatings.

Figure 3:
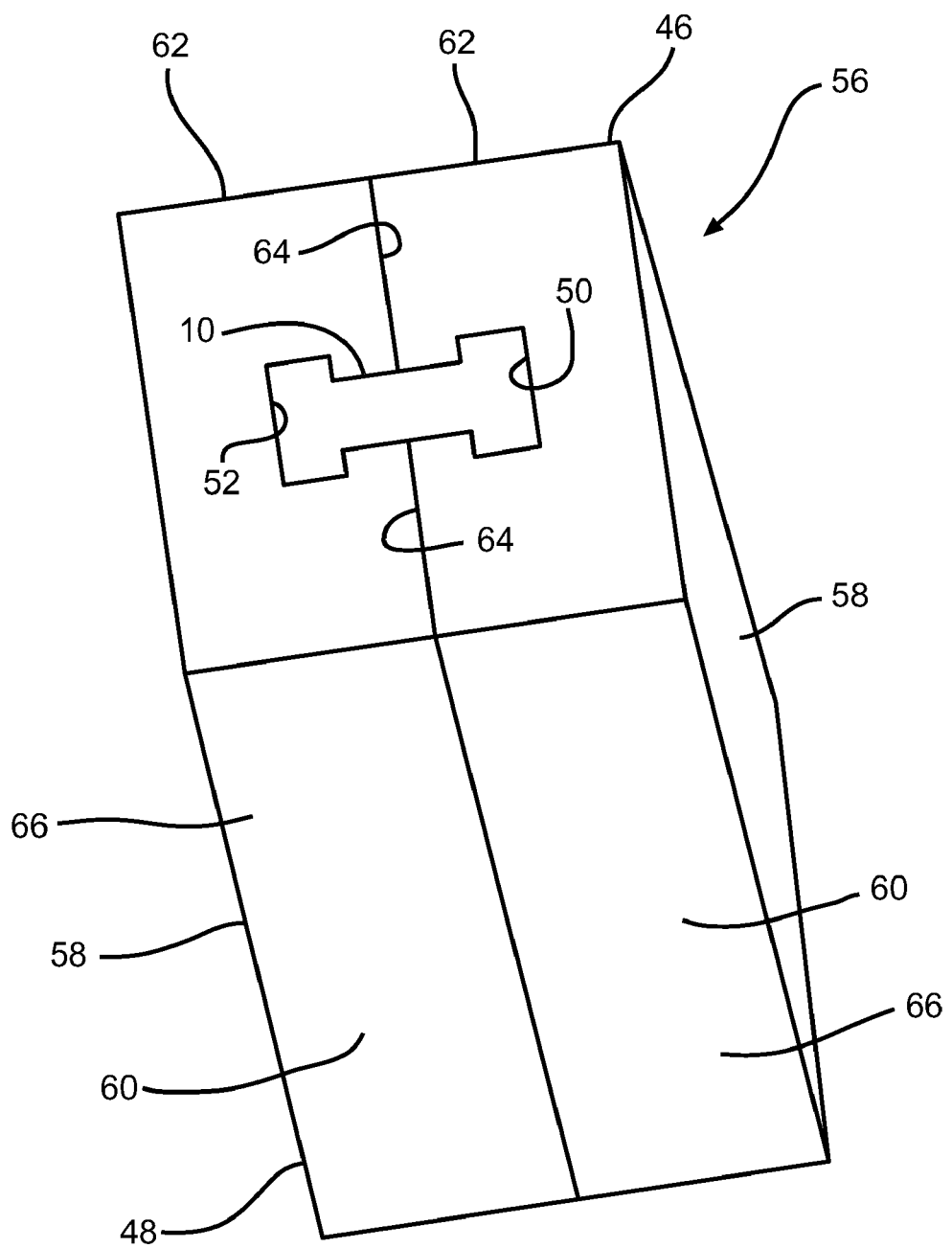
FIG. 3 is a perspective view of two furniture members joined together by a coupling according to the invention to form a substantially square furniture assembly.

An alternative embodiment furniture assembly 56 is shown in FIG. 3. The assembly 56 has a substantially rectangular first furniture member 46 including a first member groove 50, a substantially rectangular second furniture member 48 including a second member groove 52 joined together by a coupling 10. Each furniture member 46 and 48 includes an outside surface 58, a first side surface 60, a second side surface 62 and an inside surface 64. In an embodiment, each of the furniture members 46 and 48 is covered with a laminate 66 on the on the outside, first side and second side surfaces 58-62 with a slight return wrap on the inside surface 64. The assembly 56 provides a substantially square, laminate covered post that can be used as, for example, a leg for a table.

Figure 4:
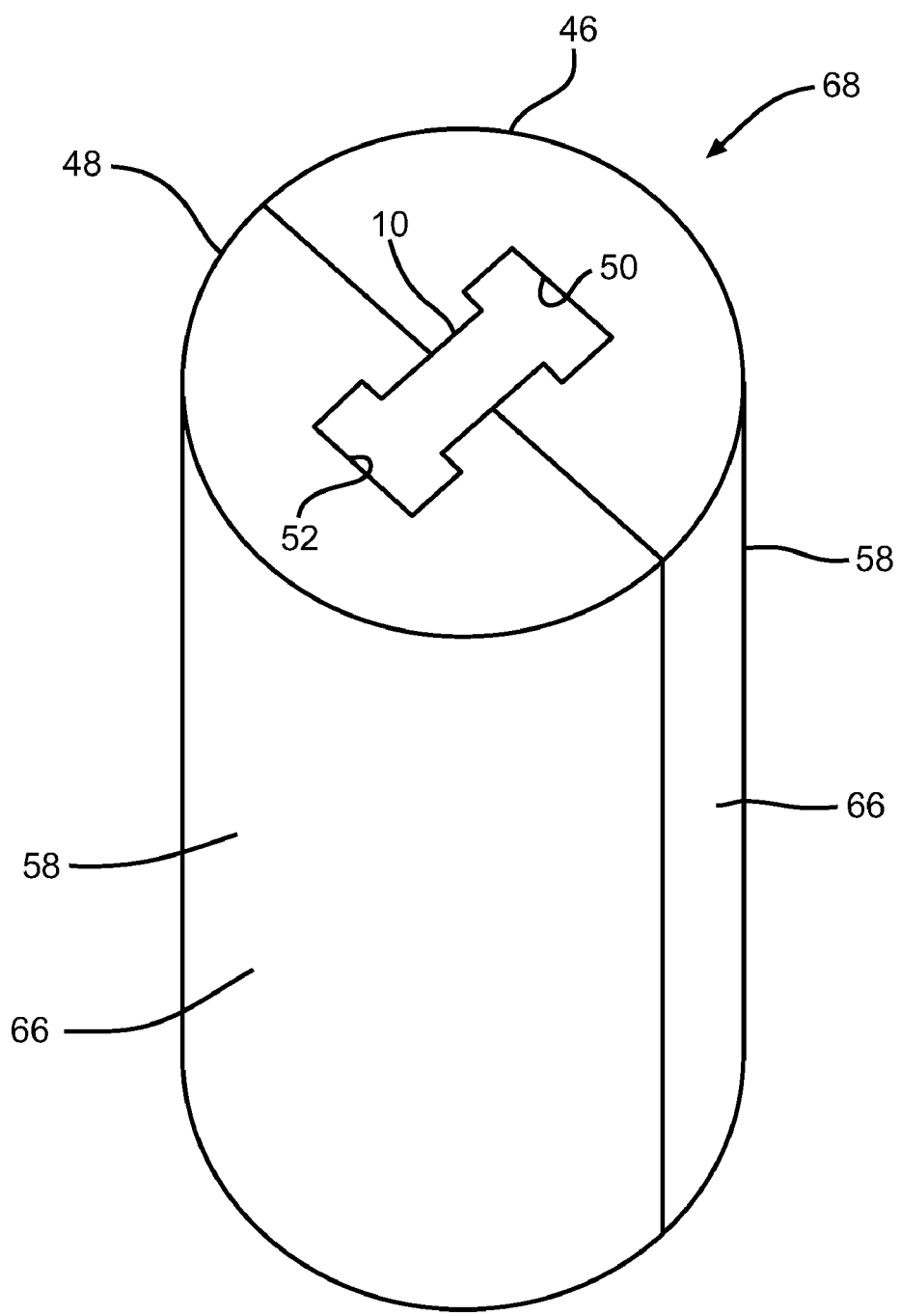
FIG. 4 is a perspective view of two furniture members joined together by a coupling according to the invention to form a substantially round furniture assembly.

Referring to FIG. 4, an alternative embodiment furniture assembly 68 is shown. The assembly 68 has a substantially semi-circular first furniture member 46 including a first member groove 50, a substantially semi-circular second furniture member 48 including a second member groove 52 joined together by a coupling 10. Each furniture member 46 and 48 includes an outside surface 58 and an inside surface 64. In an embodiment, each of the furniture members 46 and 48 is covered with a laminate 66 on the outside surface 58 with a slight return wrap on the inside surface 64. The assembly 68 provides a substantially round, laminate covered post that can be used as, for example, a leg for a table.

Figure 5:
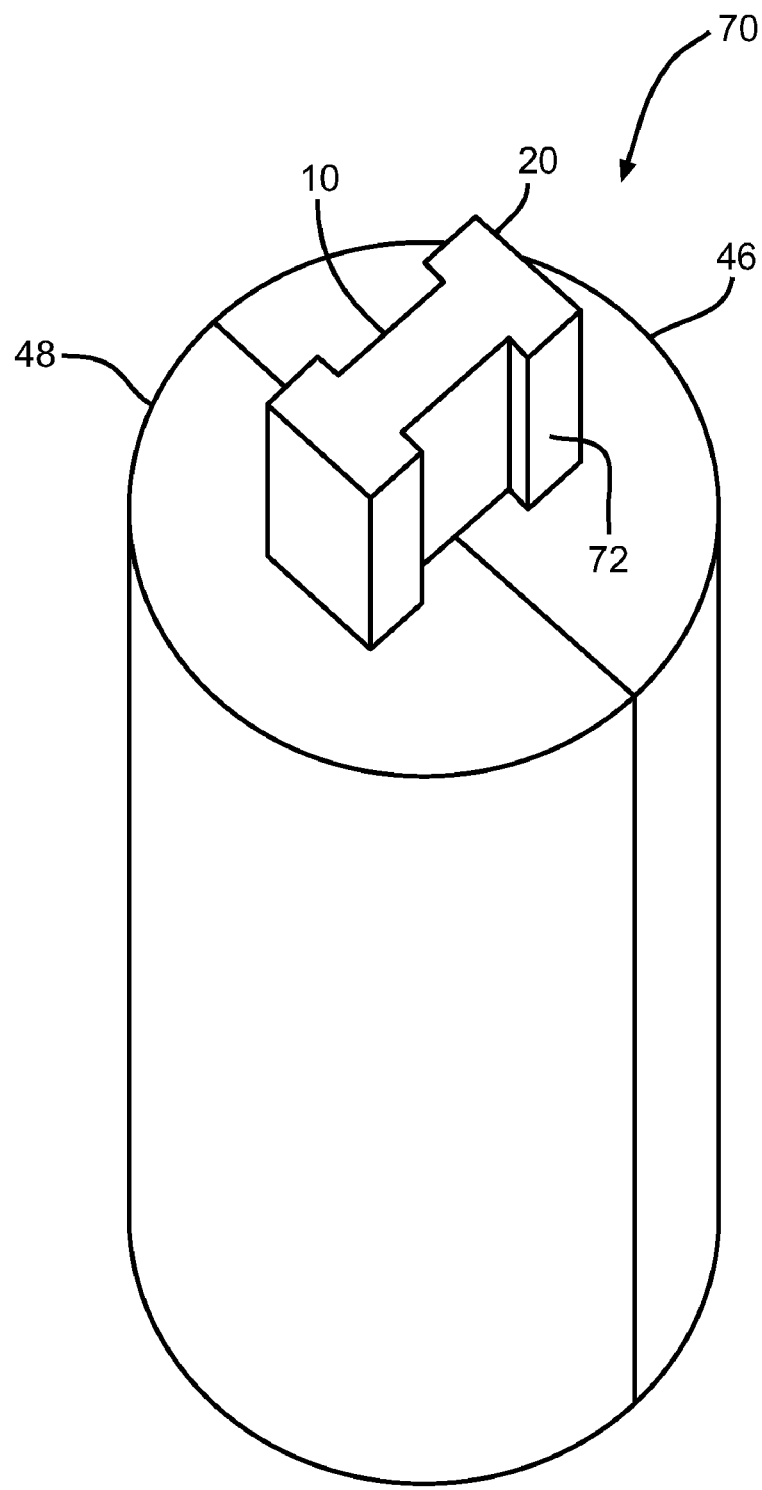
FIG. 5 is a perspective view of two furniture members joined together by a coupling according to the invention to form a furniture assembly in which the coupling extends from the assembly.

An alternative embodiment furniture assembly 70 is shown in FIG. 5. This embodiment is similar to the furniture assembly 68 of FIG. 4. In this embodiment, the second end 20 of the coupling 10 extends outwardly from the first and second furniture members 46 and 48 to form a connection portion 72. The connection portion 72 can be, for example, inserted in corresponding grooves of another structure to connect the furniture assembly 70 to the other structure.

Figure 6:
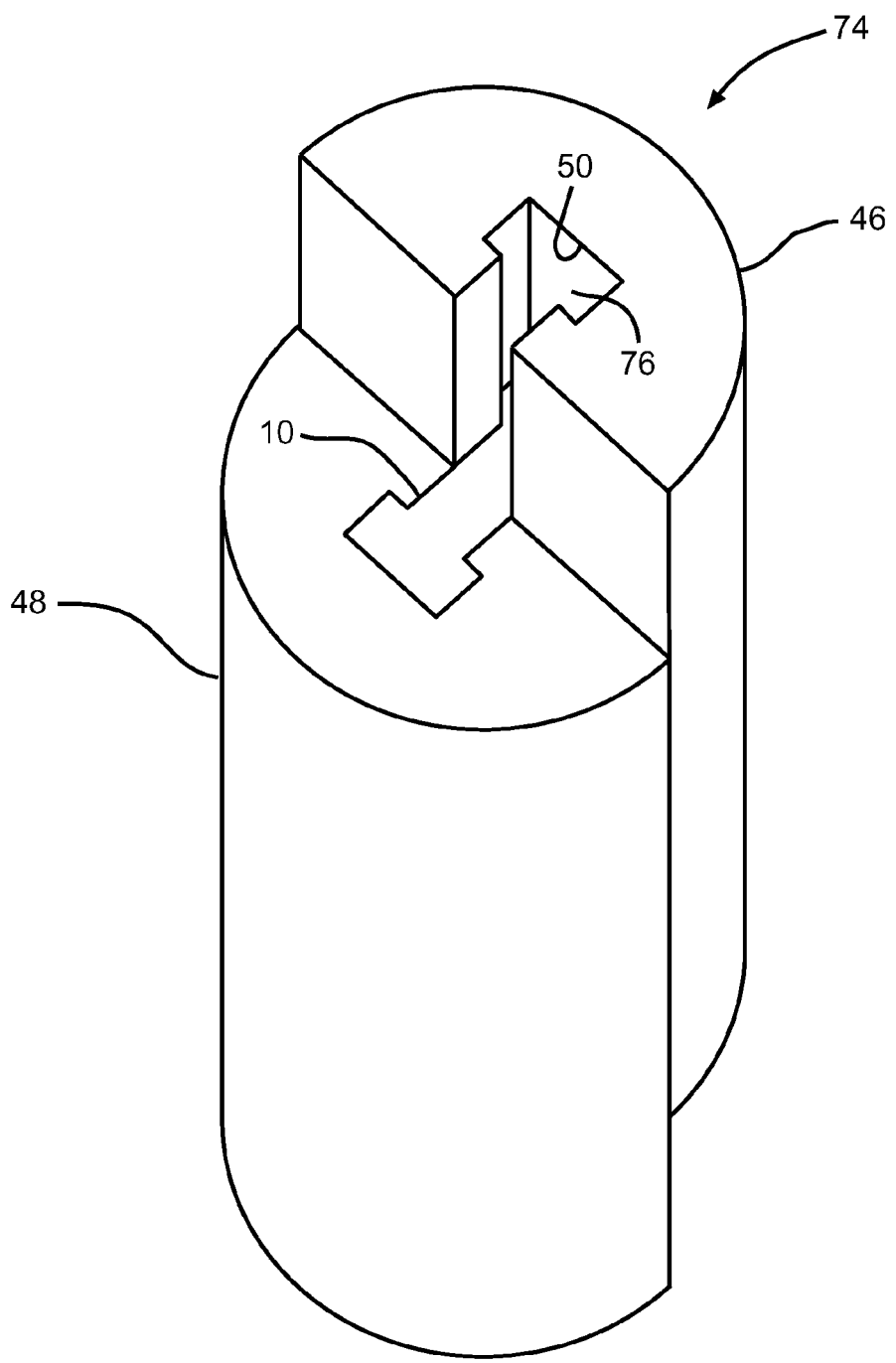
FIG. 6 is a perspective view of two furniture members joined together by a coupling according to the invention to form a furniture assembly in which the groove of one of the furniture members is open for the insertion of a coupling from another furniture assembly or another device.

Referring to FIG. 6, an alternative embodiment furniture assembly 74 is shown. This embodiment is similar to the furniture assembly 68 of FIG. 4. In this embodiment, the first groove 50 of the first furniture member 46 is open to form an attachment portion 76 for the insertion of, for example, a coupling from another furniture assembly. The attachment portion 76 can also be used, for example, for the attachment of a device.

Figure 7:
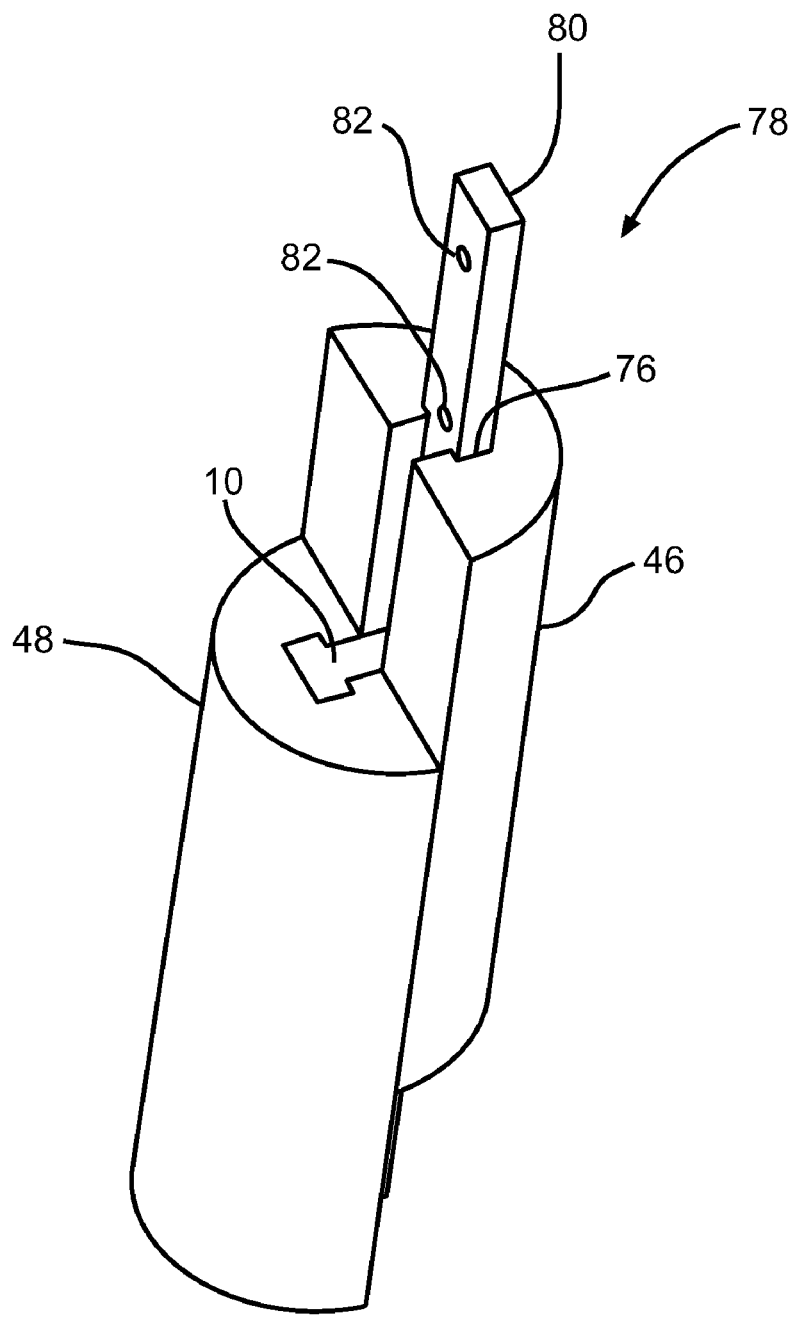
FIG. 7 is a perspective view similar to FIG. 6 showing an attachment device inserted in the groove.

An alternative embodiment furniture assembly 78 is shown in FIG. 7. This embodiment is similar to the furniture assembly 74 of FIG. 6. In this embodiment, a plate 80 having holes 82 is inserted in the attachment portion 76 of the first furniture member 46. Fastening devices such as screws can be inserted through the holes 82 to attach the furniture assembly 78 to another furniture assembly or structure. In an embodiment, the plate 80 is made of steel.

Referring to FIGS. 8-13, an alternative embodiment coupling 10' is shown. Referring to FIGS. 8 and 9, the first end 18' has a directional indicator such as an arrow 84 to guide the user during insertion of the coupling 10' in the first and second grooves 50 and 52. Referring to FIGS. 8-10, the first wall 22' has a first projection 86 and the second wall 24' has a second projection 88 at the second end 20'. Referring to FIGS. 8-13, the coupling 10' includes ribs 90. Referring to FIGS. 9 and 11, the first end 18' is tapered. Referring to FIG. 8, the coupling 10' includes openings 92 between the first and second walls 22' and 24'. In an embodiment, the arrow 84 is open between the first and second walls 22' and 24'. The openings 92 and the open arrow 84 decrease the amount of material needed to form the coupling 10'.

While the invention has been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

What is claimed is:

1. A furniture coupling assembly comprising:
   a coupling extending longitudinally between first and second ends and having a generally I-shaped cross-sectional configuration formed by generally parallel first and second plates and a center plate extending between the first and second plates, the first and second plates being tapered in the longitudinal direction at the first end of the coupling, the center plate having opposed first and second walls, the center plate having a plurality of spaced openings extending transversely between the first and second walls, the center plate having a plurality of ribs extending outwardly from the first and second walls, each of the ribs extending longitudinally between the first and second plates, one of the plurality of ribs being positioned on the first and second walls in each of the spaces between adjacent openings of the plurality of openings, the center plate having a directional indicator positioned adjacent to the first end of the coupling;
   a first furniture member having a first member groove having a cross-sectional shape corresponding to the cross-sectional configuration of one of the first and second plates of the coupling; and
   a second furniture member having a second member groove having a cross sectional shape corresponding to the cross-sectional configuration of the other of the first and second plates of the coupling, the coupling being insertable in the first and second furniture member grooves in the direction indicated by the directional indicator to engage the first and second furniture member grooves to join together the first and second furniture members.

2. The assembly of claim 1, wherein the second end has a projection positioned on one of the first or second walls.

3. The assembly of claim 1, wherein the coupling is fully inserted in the first and second member grooves.

4. The assembly of claim 1, wherein the coupling extends from the first and second member grooves.

5. The assembly of claim 1, wherein the coupling is inserted in the first and second member grooves and a portion of the first and second member grooves is open.

6. The assembly of claim 5, wherein an attachment device is inserted in the open portion of the first and second member grooves.

7. The assembly of claim 1, wherein the first and second furniture members are substantially rectangular and when joined together form a substantially square furniture component.

8. The assembly of claim 1, wherein the first and second furniture members are substantially semi-circular and when joined together form a substantially round furniture component.

* * * * *